Jan. 13, 1953 R. SUEUR ET AL 2,625,592
ASYMMETRICAL CONDUCTIVE ELEMENT
Filed Oct. 29, 1949
FIG. 1
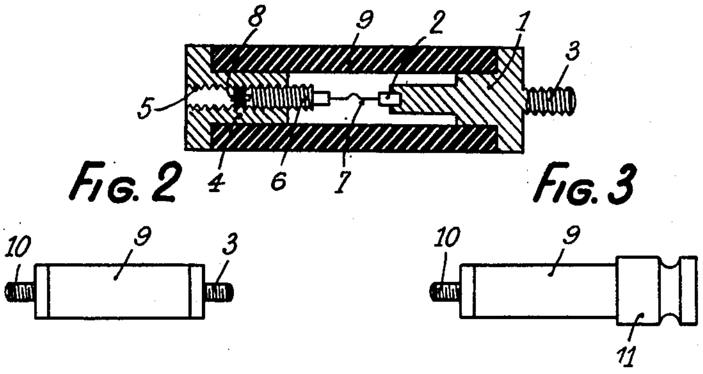
FIG. 2, FIG. 3
FIG. 4
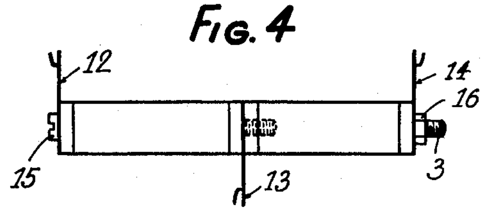
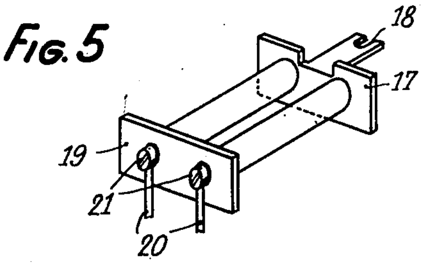
FIG. 5
FIG. 6
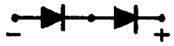
FIG. 7
FIG. 8
FIG. 9
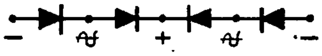
FIG. 10
FIG. 11
FIG. 12
INVENTORS:
RENÉ SUEUR, HEINRICH WELKER,
HERBERT MATARÉ, BERNHARD BETHGE
BY Theodore Hafner
ATTORNEY Patented Jan. 13, 1953 2,625,592

UNITED STATES PATENT OFFICE 2,625,592

ASYMMETRICAL CONDUCTIVE ELEMENT

René Sueur, Paris, Heinrich Welker and Herbert Mataré, Vaucresson, and Bernhard Bethge, Fontenay sous Bois, France, assignors to Societe Anonyme dite: Compagnie des Freins et Signaux Westinghouse, Paris, France Application October 29, 1949, Serial No. 124,272
In France November 5, 1948

5 Claims. (Cl. 175—366)

The known types of asymmetrical conductive elements consist essentially of two supporting electrodes having interposed therebetween a barrier layer on a semi-conductor such as selenium, silicon, germanium, copper oxide, etc.; these elements may be used in a wide field of applications such as electric telephone or telegraph circuits, electric remote control or remote measuring circuits, signalling circuits, circuits for measuring apparatus, circuits for radio electric apparatus, charging devices, etc.

As a rule, these various applications require special mountings of one or a plurality of such elements. In most instances the elements necessary for these mountings are grouped in more or less cumbersome assemblies which are not easily modified and frequently difficult to fit into the installations in which they are to be utilized. In addition, the grouping of these elements cannot always be performed easily and quickly. Moreover, lateral insulation is not always assured in a perfect manner. Finally, the requirement of rigorously matching the different component elements or adapting such elements, respectively to the specific conditions of the circuits to which they are applied, has been complied with up to now only partially.

It is an object of this invention to provide an asymmetrical conductive element designed to eliminate these various drawbacks and, in particular, to make it possible to produce an extremely simple and efficient assembly. The improved element is adaptable to many combinations with similar elements and may be associated therewith, so as to realize the best possible arrangement of elements for a given emplacement and a predetermined mounting.

The asymmetrical conductive element according to the invention is formed essentially of two conductive supports: one conductive support carries a semi-conductor such as selenium, silicon, germanium, copper oxide, etc., and represents a male (or female) connecting device; a second conductive support carries the wire in point contact with the semi-conductor and represents a female (or male) connecting device. The two supports are mounted on a high frequency insulator made of steatite or other suitable material which completely surrounds the semi-conductor point contact wire assembly. Both male and female connecting devices have similar characteristics to permit interconnection of adjacent elements.

Preferably, the aforesaid insulator is metal used to permit the conductive supports to be firmly secured by welding or soldering to the insulator in order to assure air-tightness of the element.

Preferably also the conductive support which carries the point contact wire is internally threaded; a screw fitting in the threaded hole carries the wire so as to make it possible to adjust the contact pressure of the wire tip against the semi-conductor; the aforesaid support screw is split to assure good tightening of the screw and holding the latter in its position of adjustment. An air-tight cement stopper is also provided for additionally maintaining the screw in this position, once the adjustment has been made.

These and other objects and advantages of the invention will appear in the course of the following description and with reference to the drawing annexed hereto. The drawing shows an embodiment of the invention diagrammatically and only by way of example, together with various ways of mounting.

In the drawing:

Figure 1 is a longitudinal section of an asymmetrical conductive element according to the invention;

Figure 2 is an elevational view of the same element, provided at both ends with male connecting devices;

Figure 3 is an elevational view of the same element provided, at one end, with a male connecting element, and, at the other end, with a contact head;

Figure 4 is an elevational view showing a series assembly of two elements similar to those of Figure 1;

Figure 5 is a perspective view of two of such elements associated in parallel, and Figures 6 to 12 are diagrams of possible arrangements of one or more asymmetric conductive elements, according to the invention.

Referring to Figure 1, the asymmetrical conductive element according to the invention comprises, on the one hand, a conductive support 1 which carries a crystal semi-conductor 2 (for example of silicon, selenium, germanium, etc.) and which terminates in a male connecting device which, in the example shown, is a screw-threaded stud 3. On the other hand, the element comprises a supporting member 4 of conductive material having an axial screw-threaded hole 5 having the same pitch as that of stud 3 permitting insertion of micrometric adjusting screw 6. The inner end of screw 6 carries a point contact wire 7 adapted to engage with appropriate pressure the semi-conductive crystal 2. Wire 7 is secured to screw 6 by any suitable means known per se. The axial screw-threaded hole 5 serves as a female connecting member.

Preferably, supporting member 6 is split in order to assure tightening of screw 6 and holding it firmly in the position adjusted to assure appropriate pressure of point contact wire 7 upon semi-conductive crystal 2. Once this adjustment has been assured, screw 6 is also held in position by the insertion of stopper 8 formed of airtight cement. This assures inviolability of the element and air-tightness.

Both supporting members 1 and 4 are connected through sleeve 9 of high frequency insulating material (such as steatite). Sleeve 9 surrounds, encloses and protects the assembly of semi-conductive crystal 2 and point contact wire 7. Preferably, the inner surface and the end faces of sleeve 9 are metallized to permit supporting members 1 and 4 to be firmly welded or soldered to sleeve 9.

The element thus formed may be coated externally with any suitable varnish or lacquer (such as silicone) adapted to improve airtightness, surface resistivity, etc., of the element.

The element just described may be used in many different mountings. If used alone, it may be fitted as shown in Figure 2 with a screw threaded stud 10 inserted in tap hole 5. Both studs 3 and 10 serve for the fixation of connecting wires by means of nuts (not shown); alternatively the element may be provided as shown in Figure 3, on one side, with a contact head 11 of any convenient shape, which is screwed on stud 3 and, on the other side, with stud 10 screwed, as in the case of Figure 2, in female tapping 5.

In Figure 4 there is shown the series assembly of two elements of the type illustrated in Figure 1. Connecting tags, such as shown at 12, 13 and 14, are secured at the end of each element. Tag 12 is secured by screw 15 engaging tapping 5 of the left-hand element. Tag 13 is secured between two elements, by threading tag 14 over stud 3 of the left-hand element and screwing stud 3 into tapping 5 of the right-hand element. Tag 14 is secured to the end of the right-hand element by threading the tag 14 on stud 3 of this element and tightening it by means of nut 16.

In Figure 5, another arrangement of two elements is shown such as are represented in Figure 1. Here these two elements are joined by a conductive plate 17 which is secured by screwing the two threaded studs 3 into corresponding tappings of these elements. Plate 17 is provided, for example, with tag 18 permitting the connection with external circuits. At the other end, the two elements are joined by another plate 19 which in the example shown, is made of insulating material. Connecting cables 20 are secured to the respective elements by means of screws 21 inserted into the female tappings 5 of the two elements. According to the type of mounting to be realized, a conductive plate similar to plate 17 may be substituted for insulating plate 19.

It will be understood that these mountings are given only by way of example; other assemblies of two or more elements of the type shown in Figure 1 may be realized, depending upon the circuits in which these elements are to be incorporated.

In Figures 6 to 12, diagrams of possible arrangements made with one or several elements are shown, as follows:

The arrangement of a single element (Figure 2) is represented in Figure 6.

The end-to-end arrangement of two elements (Figure 4) is represented in Figure 7 (series type mounting); and in Figures 9 and 11 (opposition type mounting).

The end-to-end arrangement of four elements is represented in Figure 8 (series type mounting); in Figure 10 (opposition type mounting in groups of two, with the point of maximum instantaneous potential or positive polarity in the center); and in Figure 12 (opposition type mounting in groups of two, with the point of minimum instantaneous potential or negative polarity in the center).

The various cases examined hereabove are obviously only examples showing the very great variety of mountings which can be realized in a very simple manner in accordance with the invention.

From the foregoing, it will be seen that the composition of the asymmetrical conductive elements according to the invention offers a very great flexibility in mounting whereby the most diversified combinations may be realized, always with a minimum encumbrance. It will also be seen that due to the enclosing sleeve 9 the lateral insulation of the device is always perfectly assured.

We claim:

1. Asymmetrical conductive element comprising a pair of conductive supports, semi-conductive and conductive contact members supported thereon, respectively, in point contact engagement, one of said supports having at one end one of said contact members and at the other end a screw forming a male type coaxial connector while the other support is provided with a threaded coaxial hole, a screw supported at the inner end thereof engaging a portion of the thread and supporting the other contact member, the other part of the thread being left free so as to form a female type coaxial connector.

2. Element according to claim 1 comprising a common insulating support for said pair of conductive supports said insulating support being metallized where in contact with said conductive supports and the latter being soldered to the metallized portion so as to form a tight mechanically resistant unit.

3. Element according to claim 1 comprising a cement plug in said threaded hole of one of said conductive supports covering the top of said screw to enhance fixation of adjustment while affording a tight seal.

4. Element according to claim 1 comprising a threaded stud engaging the free thread of said threaded hole of one of said conductive supports so as to form a second male type connector.

5. Element according to claim 1 comprising a contact head screwed on said male type coaxial connector.

RENÉ SUEUR.
HEINRICH WELKER.
HERBERT MATARÉ.
BERNHARD BETHGE.

REFERENCES CITED

The following references are of record in the file of this patent:

UNITED STATES PATENTS

| Number | Name | Date |
|---|---|---|
| 962,262 | Schloemilch et al. | June 21, 1910 |
| 1,708,573 | Hartmann et al. | Apr. 9, 1929 |
| 1,833,332 | Peter | Nov. 24, 1931 |
| 2,423,091 | Fiore et al. | July 1, 1947 |
| 2,438,892 | Becker | Apr. 6, 1948 |
| 2,472,938 | Brittain et al. | June 14, 1949 |
| 2,572,801 | Casellini | Oct. 23, 1951 |

FOREIGN PATENTS

| Number | Country | Date |
|---|---|---|
| 279,461 | Great Britain | Mar. 8, 1928 |
| 516,394 | Germany | Jan. 22, 1931 |
| 555,545 | Germany | July 26, 1932 |